US012736444B2

(12) United States Patent
Kuo

(10) Patent No.: US 12,736,444 B2
(45) Date of Patent: Sep. 15, 2026

(54) GAS DETECTION EQUIPMENT

(71) Applicant: Weltall Technology Corp., Hsinchu City (TW)

(72) Inventor: Yi-Nan Kuo, Hsinchu City (TW)

(73) Assignee: Weltall Technology Corp., Hsinchu City (TW)

( * ) Notice: Subject to any disclaimer, the term of this patent is extended or adjusted under 35 U.S.C. 154(b) by 270 days.

(21) Appl. No.: 18/772,866

(22) Filed: Jul. 15, 2024

(65) Prior Publication Data

US 2025/0027849 A1 Jan. 23, 2025

(30) Foreign Application Priority Data

Jul. 20, 2023 (TW) ................................ 112207643

(51) Int. Cl.
*G01N 1/26* (2006.01)
*G01N 1/24* (2006.01)
*G08B 21/12* (2006.01)

(52) U.S. Cl.
CPC ............... *G01N 1/24* (2013.01); *G08B 21/12* (2013.01)

(58) Field of Classification Search
CPC ........ G01N 1/24; G01N 1/26; G01N 33/0063; G01N 33/0009; G01N 1/22; G01N 1/2226; G01N 1/2273; G01N 1/10; G01N 2001/1031; G01N 2001/1037; G01N 1/16; G08B 21/12; G08B 21/16
USPC ........... 73/23.2, 31.01–31.3, 863.31, 863.32, 73/864.34, 864.81; 340/632–634
See application file for complete search history.

(56) References Cited

U.S. PATENT DOCUMENTS 7,569,093 B2 * 8/2009 Pranda .................. B01D 46/44 73/863.25
2008/0060459 A1 * 3/2008 Rich ........................ G01N 1/26 73/864.34

FOREIGN PATENT DOCUMENTS

CN 115144230 A * 10/2022 ........... G01N 1/2226
FR 3139905 A1 * 3/2024 ......... G01N 35/1095
KR 20240042838 A * 4/2024 ............... G01N 1/22

* cited by examiner

*Primary Examiner* — Robert R Raevis
(74) *Attorney, Agent, or Firm* — MUNCY, GEISSLER, OLDS & LOWE, P.C.

(57) ABSTRACT

A gas detection equipment is provided, including: a main body; sampling assemblies detachably connected to the main body, each sampling assembly including sampling inlets configured to be in communication with detected gas sources, a solenoid valve assembly configured to be in communication with the sampling inlets and the sampling outlet and to selectively control the sampling inlets to be communicated with or discommunicated from the sampling outlet, and a sampling outlet detected gas sources; a dispensing device disposed on the main body and in communication with the sampling outlet; a detection device disposed on the main body and in communication with the dispensing device with which controlling communication between the sampling outlet and the detection device detected gas sources; a processing unit disposed on the main body, connected to the detection device, and configured to receive detected data from the detection device for calculation and analysis.

12 Claims, 5 Drawing Sheets

GAS DETECTION EQUIPMENT

BACKGROUND OF THE INVENTION

Field of the Invention

The present invention relates to a detection equipment, particularly to a gas detection equipment.

Description of the Prior Art

In semiconductor manufacturing processes, the air quality in cleanroom environments, especially air molecular contamination (AMC), significantly affects semiconductor yield. Specifically, AMC can damage processing equipment, leading to high costs, low yield, and poor manufacturing quality. AMC can also contaminate the processed products, potentially altering their electrical, optical and physical properties, causing reduced yield and poor manufacturing quality. Therefore, monitoring AMC, such as acids (MA), bases (MB), condensables (MC), and dopants (MD), helps mitigate these issues. However, due to the large plant areas, moving detectors to various target areas for sampling requires much time and manpower, making conventional monitoring systems unable to provide real-time detection or requiring detectors for different target areas, which complicates multi-area monitoring and management.

The present invention is, therefore, arisen to obviate or at least mitigate the above-mentioned disadvantages.

SUMMARY OF THE INVENTION

The main object of the present invention is to provide a gas detection equipment which provides high-efficiency continuous multi-point detection.

To achieve the above and other objects, a gas detection equipment is provided, wherein the gas detection equipment includes: a main body; a plurality of sampling assemblies detachably connected to the main body, each of the plurality of sampling assemblies including a plurality of sampling inlets, a solenoid valve assembly and a sampling outlet, the plurality of sampling inlets being configured to be in communication with a plurality of detected gas sources, respectively, the solenoid valve assembly being configured to be in communication with the plurality of sampling inlets and the sampling outlet, the solenoid valve assembly being configured to selectively control at least one of the plurality of sampling inlets to be communicated with or discommunicated from the sampling outlet; a dispensing device disposed on the main body and in communication with the sampling outlet of each of the plurality of sampling assemblies; a detection device disposed on the main body and in communication with the dispensing device, the dispensing device being configured to selectively control the sampling outlet of each of the plurality of sampling assemblies to be communicated with or discommunicated from the detection device, to detect a gas from each of the plurality of detected gas sources; a processing unit disposed on the main body, connected to the detection device, and configured to receive detected data from the detection device for calculation and analysis.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
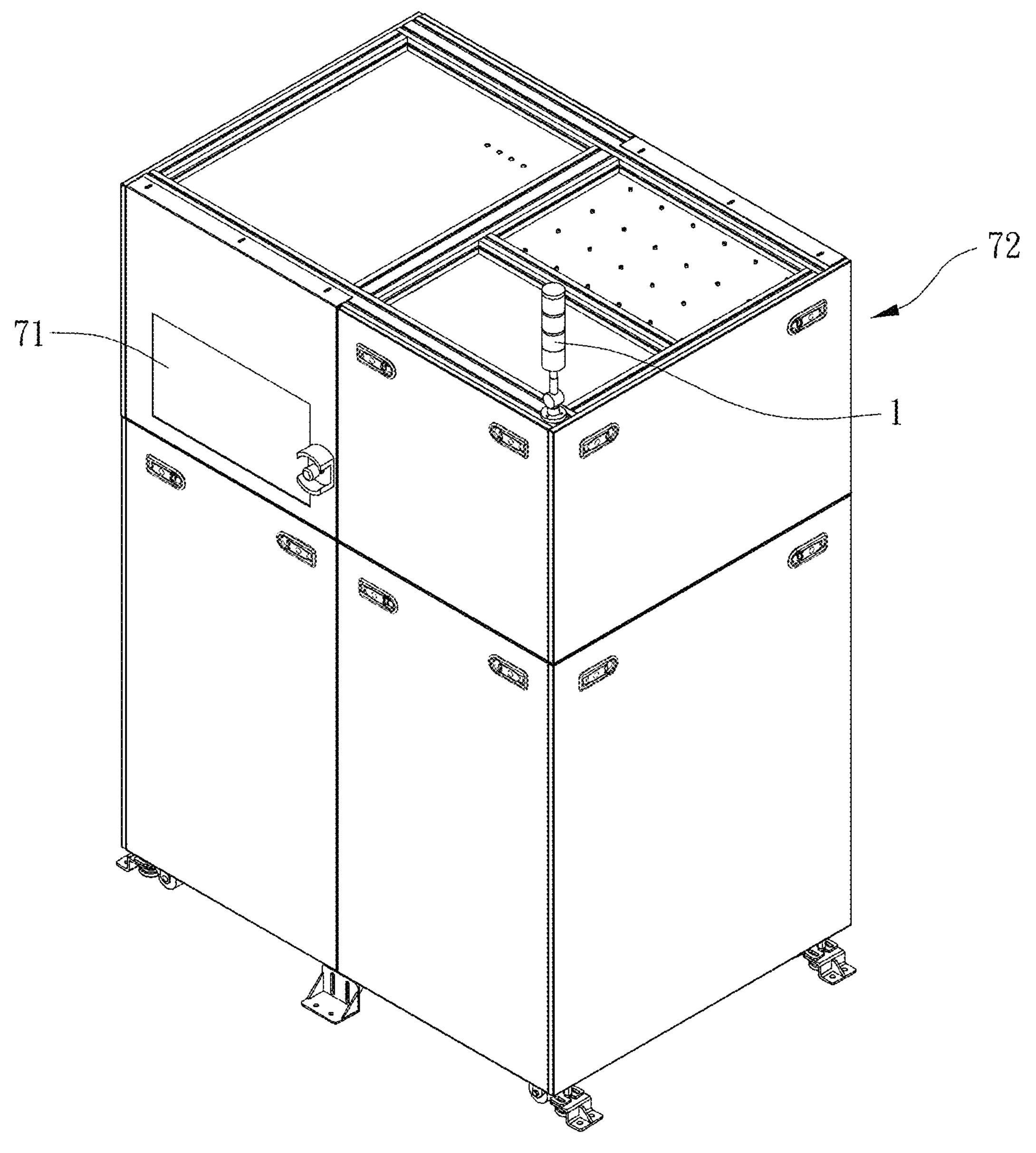
FIG. 1 is a perspective view of an exemplary embodiment of the present invention.
Figure 2:
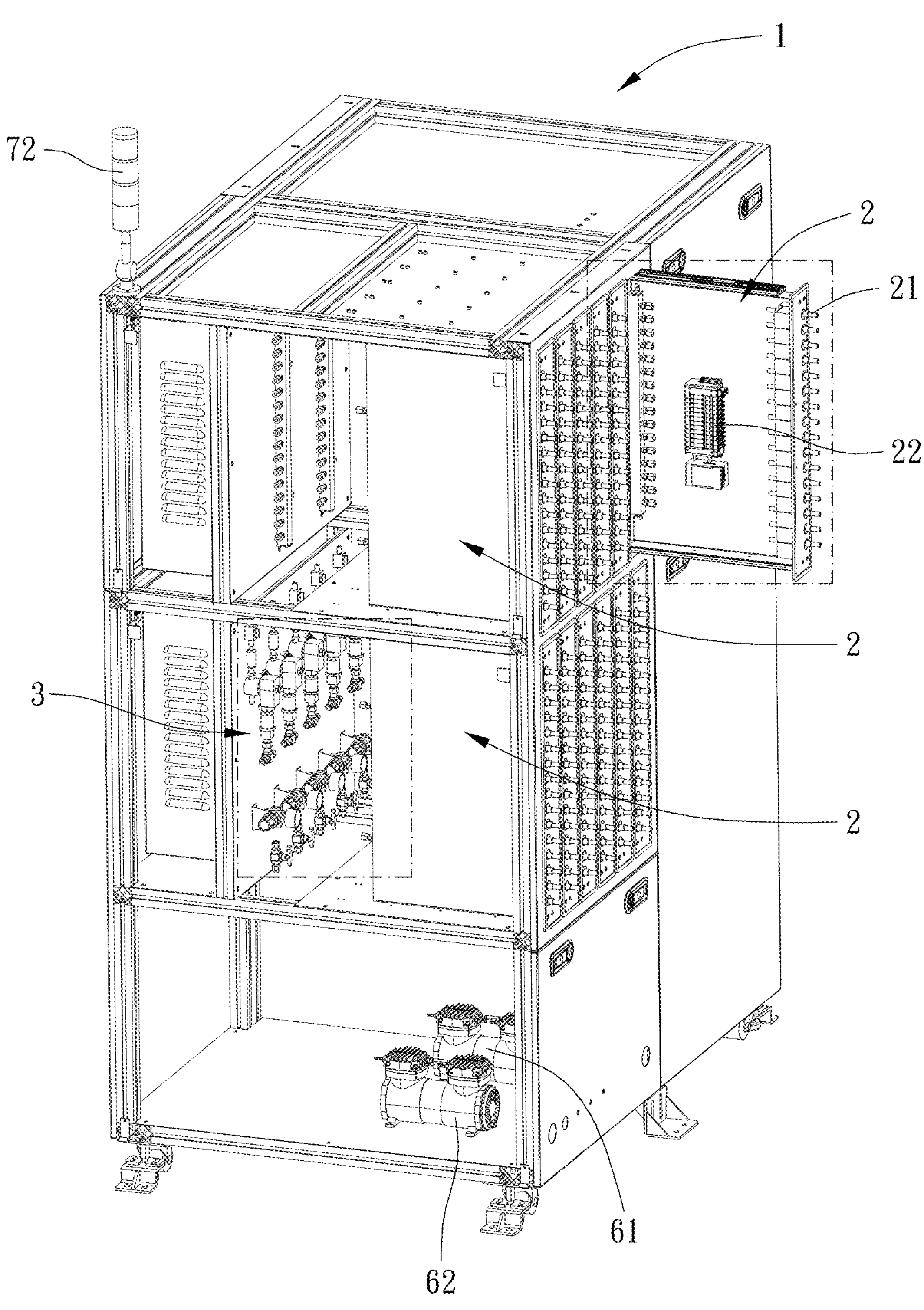
FIG. 2 is another perspective view of an exemplary embodiment of the present invention.
Figure 3:
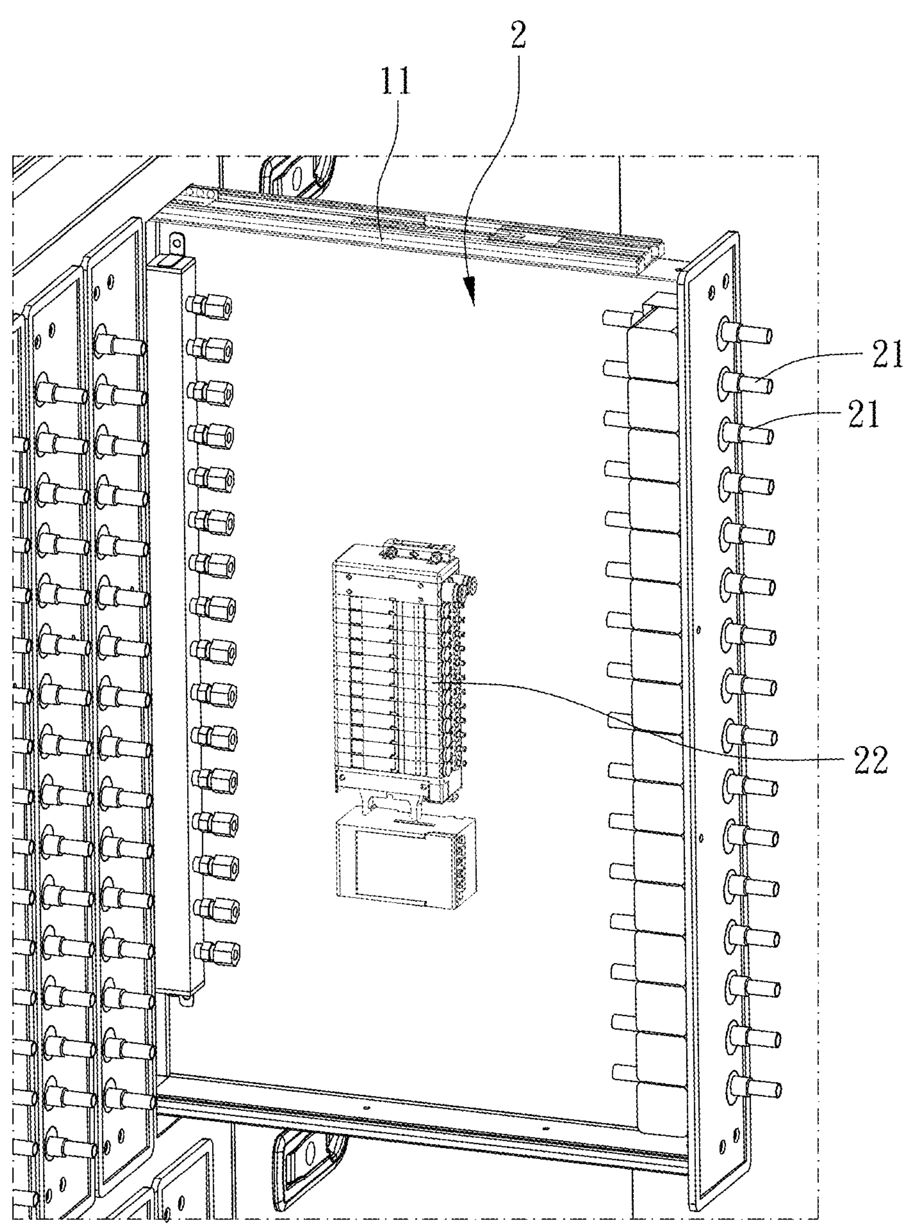
FIG. 3 is an enlarged partial view of FIG. 2.
Figure 4:
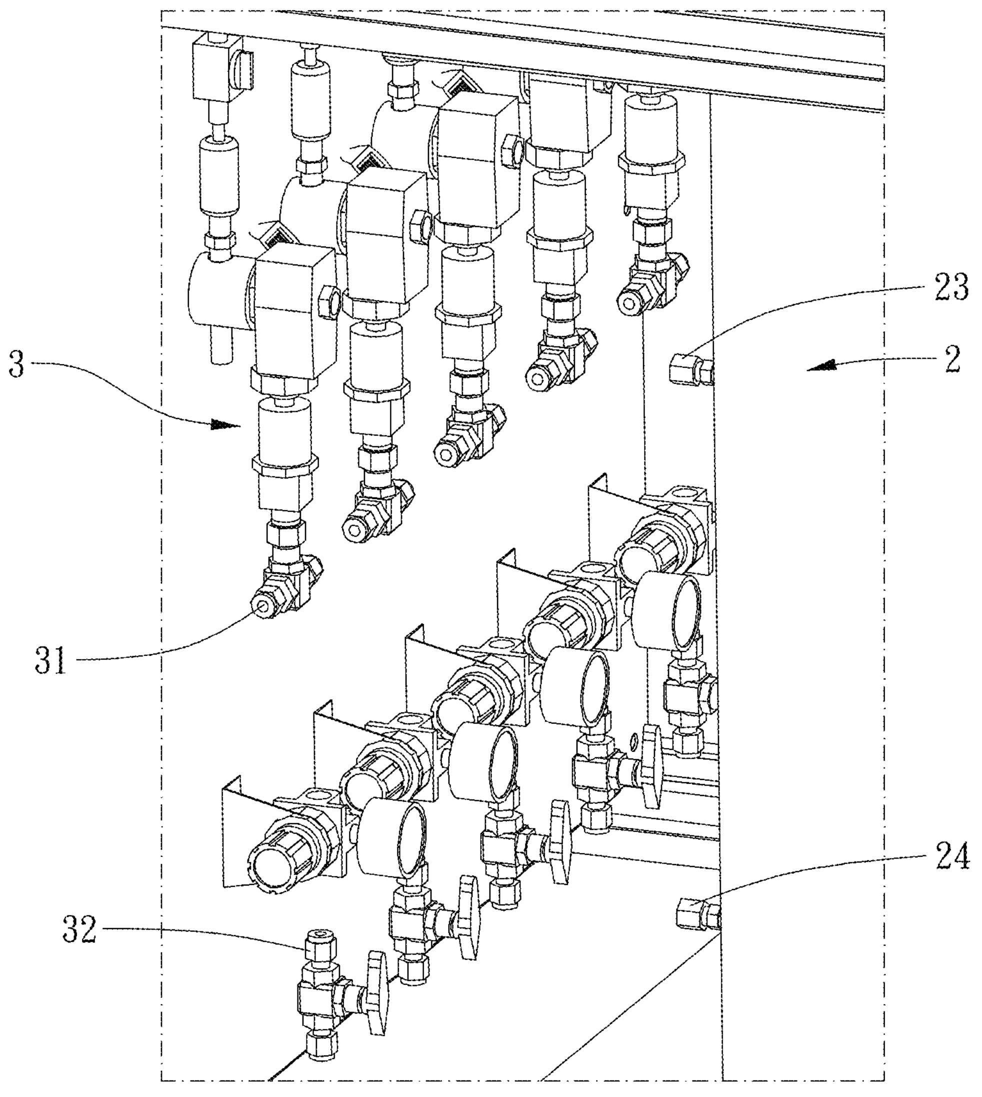
FIG. 4 is another enlarged partial view of FIG. 2.
Figure 5:
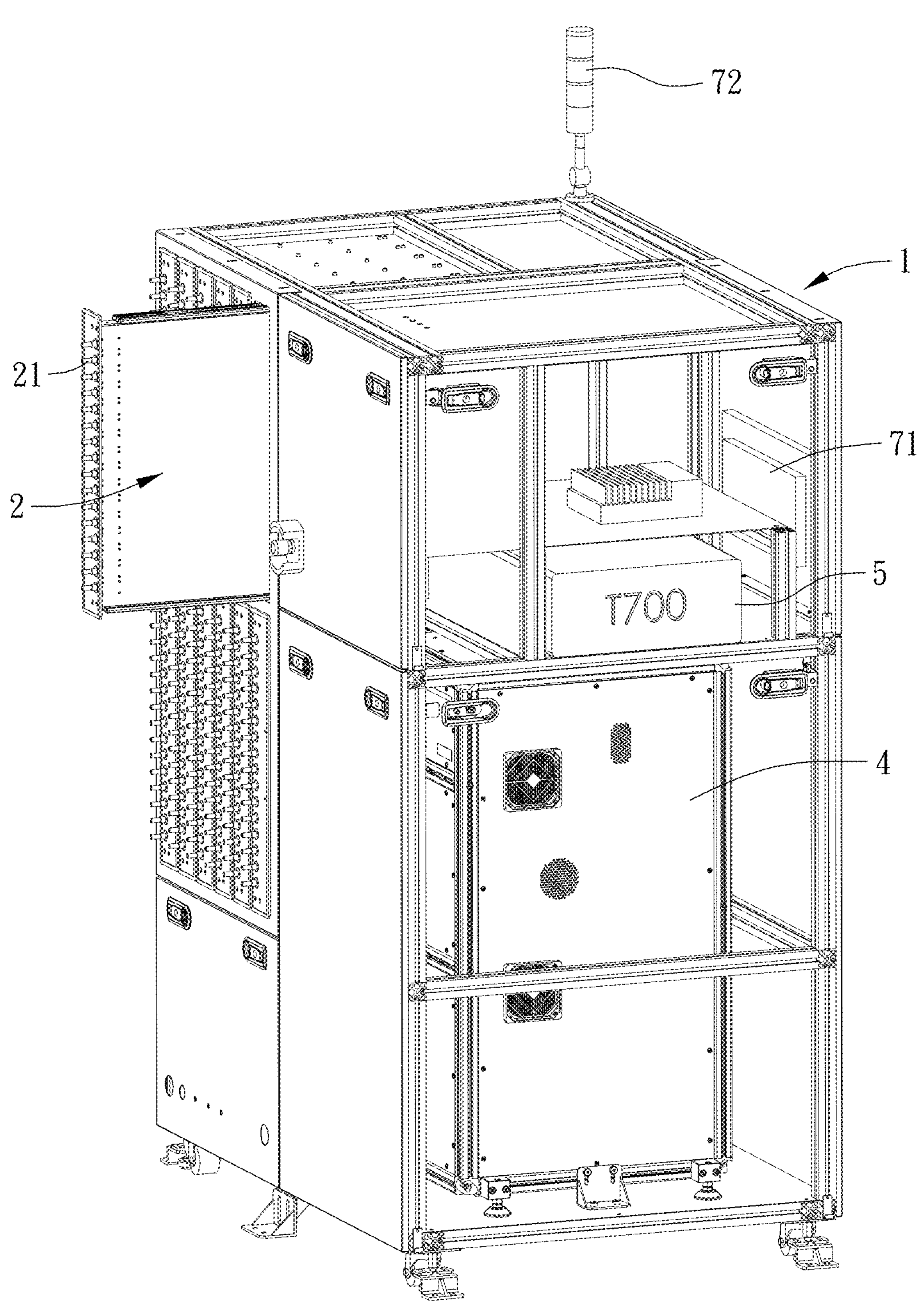
FIG. 5 is another perspective view of an exemplary embodiment of the present invention.

Please refer to FIGS. 1 to 5 for an exemplary embodiment of the present invention. A gas detection equipment of the present invention includes a main body 1, a plurality of sampling assemblies 2, a dispensing device 3, a detection device 4, and a processing unit 5.

The plurality of sampling assemblies 2 are detachably connected to the main body 1. Each of the plurality of sampling assemblies 2 includes a plurality of sampling inlets 21, a solenoid valve assembly 22, and a sampling outlet 23. The plurality of sampling inlets 21 are configured to be in communication with a plurality of detected gas sources. In this embodiment, the plurality of detected gas sources are environmental gases from different working areas. The solenoid valve assembly 22 is in communication with the plurality of sampling inlets 21 and the sampling outlet 23, and solenoid valve assembly 22 is configured to selectively control at least one of the plurality of sampling inlets 21 to be communicated with or discommunicated from the sampling outlet 23.

The dispensing device 3 is disposed on the main body 1 and in communication with the sampling outlet 23 of each of the plurality of sampling assemblies 2.

The detection device 4 is disposed on the main body 1 and in communication with the dispensing device 3. The dispensing device 3 is configured to selectively control the sampling outlet 23 of each of the plurality of sampling assemblies 2 to be communicated with or discommunicated from the detection device 4, to detect the gas from each of the plurality of detected gas sources The processing unit 5 is disposed on the main body 1 and connected to the detection device 4 to receive detected data from the detection device 4 for calculation and analysis. Through the action of the solenoid valve assembly 22 each of the plurality of sampling assemblies 2 and the dispensing device 3, the gas detection equipment can quickly input the gases from different working areas into the detection device 4 for detection respectively, allowing to quickly detect whether the gases from different working areas are abnormal, which can maintain operational safety and ensure product yield. Additionally, as the plurality of sampling assemblies 2 are detachably connected to the main body 1, the number of sampling assemblies 2 can be increased or decreased according to various operation environments, and the plurality of sampling assemblies 2 can be conveniently replaced and maintained.

Specifically, the plurality of sampling assemblies 2 are detachably and slidably disposed on the main body 1. In this embodiment, the main body 1 includes a plurality of rail assemblies 11, and each of the plurality of sampling assemblies 2 is detachably and slidably disposed on one of the rail assemblies 11 for easy installation and removal.

The plurality of sampling inlets 21 of the plurality of sampling assemblies 2 are protrusive out beyond the main body 1, and the sampling outlet 23 of each of the plurality of sampling assemblies 2 is located within the main body 1. The plurality of sampling inlets 21 protruding out beyond the main body 1 is conducive to easy connection to the detected gas sources via pipelines.

Preferably, the gas detection equipment further includes a first pump 61, and the first pump 61 is in communication with the dispensing device 3 to transport the gases from the plurality of detected gas sources through the plurality of sampling assemblies 2 to the dispensing device 3, respectively, thereby improving gas flow efficiency.

In this embodiment, the dispensing device 3 includes a plurality of dispensing inlets 31, and each of the plurality of dispensing inlets 31 is in communication with the sampling outlet 23 of one of the plurality of sampling assemblies 2. The dispensing device 3 is configured to respectively control the sampling outlet 23 of each of the plurality of sampling assemblies 2 to be communicated with or discommunicated from the detection device 4. The dispensing device 3 can perform pre-sampling operations, where after one of the dispensing inlets 31 has finished sampling, it can quickly switch to allow another dispensing inlet 31 to flow into the detection device 4 for detection. Alternatively, in other embodiments, the detection device 4 may have a plurality of detection modules, and the dispensing device 3 can quickly guide a plurality of detected gas sources into the detection modules, providing continuous multi-point detection and high efficiency.

Each of the plurality of sampling assemblies 2 further includes a first cleaning inlet 24, and the first cleaning inlet 24 is in communication with the solenoid valve assembly 22. The dispensing device 3 further includes a plurality of second cleaning inlets 32, and the first cleaning inlets 24 and the second cleaning inlet 32 are in communication with a cleaning gas source.

Preferably, the gas detection equipment further includes a second pump 62, and the second pump 62 is configured to transport the cleaning gas source (such as clean air or inert gases, such as nitrogen) to the first cleaning inlets 24 and the second cleaning inlets 32 to clean the plurality of sampling assemblies 2 and the dispensing device 3, which prevents the mixing of different detected gas sources and ensures accurate detection results.

Preferably, the gas detection equipment further includes a display 71, and the display 71 is disposed on the outside of the main body 1 and in communication with the processing unit 5 to display the calculation and analysis results from the processing unit 5 for reviewing.

Preferably, the gas detection equipment further includes an alerting device 72, and the alerting device 72 is disposed on the main body 1 and in communication with the processing unit 5, and the alerting device 72 is configured to provide an alert when abnormal condition occurs. In this embodiment, the alerting device 72 is a lighting device which can provide a prominent alerting sign.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A gas detection equipment including:

a main body;

a plurality of sampling assemblies detachably connected to the main body, each of the plurality of sampling assemblies including a plurality of sampling inlets, a solenoid valve assembly and a sampling outlet, the plurality of sampling inlets being configured to be in communication with a plurality of detected gas sources, respectively, the solenoid valve assembly being configured to be in communication with the plurality of sampling inlets and the sampling outlet, the solenoid valve assembly being configured to selectively control at least one of the plurality of sampling inlets to be communicated with or discommunicated from the sampling outlet;

a dispensing device disposed on the main body and in communication with the sampling outlet of each of the plurality of sampling assemblies;

a detection device disposed on the main body and in communication with the dispensing device, the dispensing device being configured to selectively control the sampling outlet of each of the plurality of sampling assemblies to be communicated with or discommunicated from the detection device, to detect a gas from each of the plurality of detected gas sources; and a processing unit disposed on the main body, connected to the detection device, and configured to receive detected data from the detection device for calculation and analysis.

2. The gas detection equipment of claim 1, wherein the plurality of sampling assemblies are detachably and slidably disposed on the main body.

3. The gas detection equipment of claim 2, wherein the main body includes a plurality of rail assemblies, and each of the plurality of sampling assemblies is detachably and slidably disposed on one of the plurality of rail assemblies.

4. The gas detection equipment of claim 3, wherein the plurality of sampling inlets of each of the plurality of sampling assemblies are protrusive out beyond the main body, and the sampling outlet of each of the plurality of sampling assemblies is located within the main body; the gas detection equipment further includes a first pump, and the first pump is in communication with the dispensing device to transport the plurality of detected gas sources through the plurality of sampling assemblies to the dispensing device, respectively; the dispensing device includes a plurality of dispensing inlets, and each of the plurality of dispensing inlets is in communication with the sampling outlet of one of the plurality of sampling assemblies; each of the plurality of sampling assemblies further includes a first cleaning inlet, the first cleaning inlet is in communication with the solenoid valve assembly, the dispensing device further includes a plurality of second cleaning inlets, and the first cleaning inlet and the second cleaning inlet are in communication with a cleaning gas source; the gas detection equipment further includes a second pump, and the second pump is configured to transport the cleaning gas source to the first cleaning inlet and the second cleaning inlet; the gas detection equipment further includes a display, and the display is disposed on the main body and in communication with the processing unit to display the calculation and analysis from the processing unit; the gas detection equipment further includes an alerting device, and the alerting device is disposed on the main body and in communication with the processing unit, and the alerting device provides an alert when an abnormal condition occurs; the alerting device is a lighting device.

5. The gas detection equipment of claim 1, wherein the plurality of sampling inlets of each of the plurality of sampling assemblies are protrusive out beyond the main body, and the sampling outlet of each of the plurality of sampling assemblies is located within the main body.

6. The gas detection equipment of claim 1, further including a first pump, wherein the first pump is in communication with the dispensing device to transport the plurality of detected gas sources through the plurality of sampling assemblies to the dispensing device, respectively.

7. The gas detection equipment of claim 1, wherein the dispensing device includes a plurality of dispensing inlets, and each of the plurality of dispensing inlets is in communication with the sampling outlet of one of the plurality of sampling assemblies.

8. The gas detection equipment of claim 1, wherein each of the plurality of sampling assemblies further includes a first cleaning inlet, the first cleaning inlet is in communication with the solenoid valve assembly, the dispensing device further includes a plurality of second cleaning inlets, and the first cleaning inlet and the second cleaning inlet are in communication with a cleaning gas source.

9. The gas detection equipment of claim 8, further including a second pump, wherein the second pump is configured to transport the cleaning gas source to the first cleaning inlet and the second cleaning inlet.

10. The gas detection equipment of claim 1, further including a display, wherein the display is disposed on the main body and in communication with the processing unit to display the calculation and analysis from the processing unit.

11. The gas detection equipment of claim 1, further including an alerting device, wherein the alerting device is disposed on the main body and in communication with the processing unit, and the alerting device is configured to provide an alert when an abnormal condition occurs.

12. The gas detection equipment of claim 11, wherein the alerting device is a lighting device.

* * * * *